United States Patent [19]

Wichman, deceased et al.

[11] 4,151,821
[45] May 1, 1979

[54] ENGINE FUEL SUPPLY SYSTEM

[76] Inventors: Ralph D. Wichman, deceased, late of Sacramento, Calif.: by Adelaide S. Wichman, Assignee of the Entire Estate of Ralph D. Wichman, 2554 Taft St., Sacramento, Calif. 95815; Edward P. Goodrum, 6004 Windlas Ct., Citrus Heights, Calif. 95610

[21] Appl. No.: 747,643

[22] Filed: Dec. 6, 1976

[51] Int. Cl.² ............................................. F02M 31/00
[52] U.S. Cl. .............................. 123/133; 123/122 E; 123/139 AW; 123/139 BG; 261/145
[58] Field of Search ........... 123/122 E, 133, 139 AW, 123/139 BG; 261/50 A, 145, 121

[56] References Cited
U.S. PATENT DOCUMENTS

| | | | |
|---|---|---|---|
| 2,315,882 | 4/1943 | Trimble | 123/121 |
| 3,288,445 | 11/1966 | Mennesson | 123/139 AW |
| 3,718,000 | 2/1973 | Walker | 123/121 |
| 3,738,334 | 6/1973 | Farr | 123/133 |
| 3,886,919 | 6/1975 | Freeman | 123/133 |
| 4,050,419 | 9/1977 | Harpman | 123/133 |

*Primary Examiner*—Ronald H. Lazarus
*Attorney, Agent, or Firm*—Lothrop & West

[57] ABSTRACT

An inner surface of a fuel atomization chamber is heated to a temperature sufficient to vaporize gasoline. A nozzle sprays liquid gasoline against the hot surface at a high velocity so that the gasoline striking the hot surface is vaporized and broken down into substantially molecular particles to produce a dry gas which is fed through a metering valve into an engine air induction passageway. A spring-loaded rotary plate in the induction passageway serves as a sensor of the quantity of air flowing through the induction passageway and is connected to the metering valve through a cam mechanism so configured as to maintain the air-fuel ration in the induction passageway at optimum value.

During start up, when the inner surface of the atomization chamber has not reached its operating temperature, propane or other liquified petroleum gas is fed into the engine rather than vaporized gasoline. Alternatively, liquid gasoline may be injected into the induction passageway for starting, with the amount of fuel injected being determined by the position of the rotary plate.

2 Claims, 8 Drawing Figures

ENGINE FUEL SUPPLY SYSTEM

BACKGROUND OF THE INVENTION

The fuel supply system of a gasoline engine is presently one of the major causes of inefficient engine operation and atmospheric pollution.

The most common device for introducing a mixture of fuel and air into an engine is a carburetor which comprises an air induction passageway formed with a flow restriction, or venturi. The pressure drop in the venturi is utilized to suck liquid gasoline from a reservoir into the induction passageway, where it is atomized and mixed with air to form a combustible mixture. A major drawback of the basic standard carburetor is that the discharge coefficients of air and gasoline in the venturi are unequal, with the result that the ratio of air to fuel decreases as the quantity of air flowing through the venturi increases. A complicated system of second fuel passageways and vents is therefore provided in a standard carburetor to overcome this effect to an extent which allows the engine to be operable. However, even a carburetor provided with such corrective elements often provides an air-fuel ratio which is far from optimum.

An additional problem involved in supplying fuel to an engine is providing a mixture of gasoline and air in which the gasoline is in the form of tiny particles which are thoroughly mixed with the air. The greater the size of the particles, the greater the possiblity of incomplete combustion, resulting in poor fuel economy and the discharge of unburned fuel constituents into the atmosphere. Various attempts have been made to reduce the size of the gasoline particles in the fuel mixture, a common recourse being to heat, or preferably vaporize, the gasoline before mixing it with air. Such a system is disclosed in U.S. Pat. No. 3,738,334 granted June 12, 1973 to R. S. Farr, in which gasoline is heated in a vessel and vaporized gasoline is fed from the upper part of the vessel into a carburetor. Although this system results in increased combustion efficiency, the vaporized gasoline is in the form of droplets of relatively large size compared to the sizes of the molecules of the gasoline constituents.

Other systems are under development in which gasoline is atomized by an ultrasonic generator prior to mixing with air. Although such a system provides gasoline particles of a smaller size than the system of the above discussed patent, the particles are still relatively large compared to the size of the gasoline molecules.

SUMMARY OF THE INVENTION

The invention relates to a fuel atomizing and proportioning system for an internal combustion engine for supplying gasoline into the engine in the form of a dry gas constituted of substantially molecular particles.

The basic concept of the present invention is to spray liquid gasoline against a hot inner surface of an atomization chamber at high velocity in such a manner that the gasoline is not only vaporized but broken down into particles of substantially molecular size, followed by metering the dry gas into the air stream in a predetermined manner such as to provide an optimum fuel-air ratio under a wide range of engine loads and demands.

The hydrocarbon molecules in the gasoline combine with oxygen molecules in the air to form a perfect explosive mixture. This mixture detonated in a cylinder of an engine produces a hotter, but shorter explosion in which the pressure of the combusted gas lags the explosion but produces a higher pressure than is obtainable by any prior method. When the engine exhaust valve opens, the flame in the cylinder is extinguished since all of the fuel has been consumed. The exhaust products are $CO_2$ and $H_2O$ in gaseous phase and no carbon monoxide, hydrocarbons or nitrogen oxides are present. All impurities in the gasoline such as sulfur, tar and ethyl of lead remain in the atomization chamber and may be removed in liquid or solid form at periodic intervals.

The system of the invention does not require an accelerator pump to introduce an over-rich fuel mixture into the engine for acceleration, since no gasoline is wasted due to inefficient combustion. Faster acceleration response and stronger acceleration than that produced by any known system is provided by the invention at a substantially ideal air-fuel ratio.

The air-fuel ratio for idling is substantially the same as for high speed operation in accordance with the invention. This eliminates the low combustion efficiency and excessive atmospheric pollution generally associated with engines under idling conditions.

A fuel-air mixture comprising molecular gasoline has an octane rating which may be considered infinite for practical purposes, and allows a compression ratio just under the Diesel point, or about 12 to 1. This allows a given engine to produce significantly more power than with a standard fuel supply system. A desired amount of power may thereby be produced by a smaller engine, which further increases the fuel economy.

It is therefore an object of the pesent invention to provide a fuel supply system for an internal combustion engine which provides greater combustion efficiency, greater fuel economy and less atmospheric pollution than any known system.

It is another object of the present invention to provide a fuel supply system which supplies fuel to an internal combustion engine comprising fuel particles of substantially molecular size thoroughly mixed with air.

It is another object of the present invention to provide a fuel supply system for an internal combustion engine which supplies propane or liquified petroleum gas to the engine during warm-up and substantially molecular gasoline to the engine after warm-up is completed.

It is another object of the invention to provide a fuel supply system for an internal combustion engine which can inject liquid gasoline into the engine during warm-up and supply substantially molecular gasoline to the engine after warm-up is completed.

It is another object of the present invention to provide a fuel atomizing and proportioning system for an internal combustion engine for supplying a mixture of substantially molecular gasoline and air to the engine and automatically maintaining the air-fuel ratio at an optimum value.

Other objects, together with the foregoing, are attained in the embodiments described in the following description and illustrated in the accompanying drawings.

DESCRIPTION OF THE PREFERRED EMBODIMENTS

While the fuel atomizing and proportioning system of the invention is susceptible of numerous physical embodiments, depending upon the environment and requirements of use, substantial numbers of the herein shown and described embodiments have been made, tested and used, and all have performed in an eminently satisfactory manner.

Figure 1:
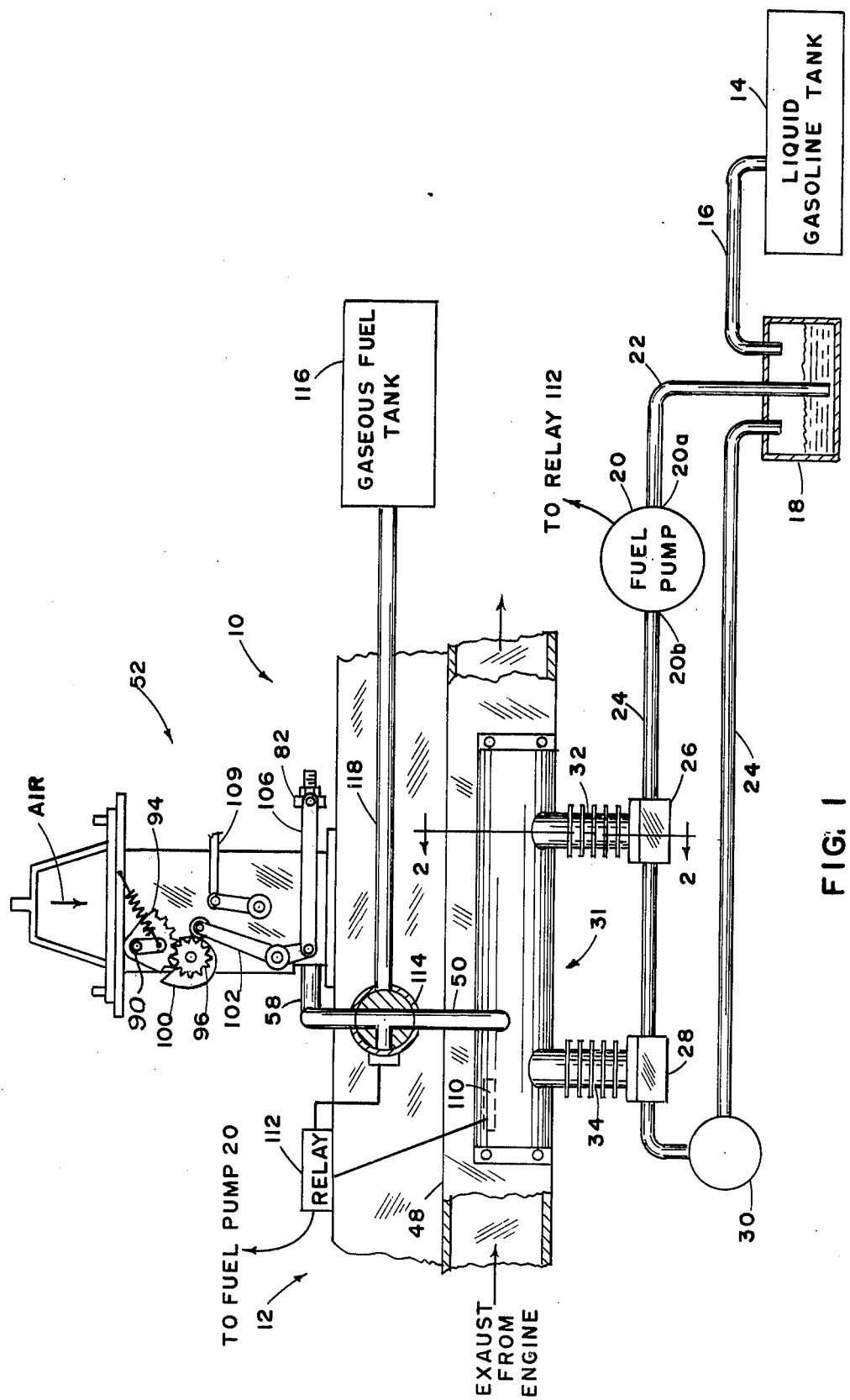
FIG. 1 is a schematic view of a first embodiment of the invention.

The fuel atomizing and proportioning system of the invention, of which a preferred but simplified embodiment is shown in schematic form in FIG. 1 and generally designated by the reference numeral 10, is utilized in connection with an internal combustion engine 12 designed to run on gasoline or a similar fuel and provided with a conventional spark ignition system, not shown.

Liquid gasoline is provided in a liquid gasoline tank 14 which communicates with a closed reservoir 18 through a pipe 16. A fuel pump 20 has an inlet 20a connected to the reservoir 18 below the liquid level therein through a pipe 22 and an outlet 20b connected to a fuel supply pipe 24. A pressure regulator valve 30 is provided in the pipe 24, the pipe being connected at its return end to the reservoir 18. Liquid gasoline is continuously circulated through the pipe 24 at a constant pressure of, for example 12 psi by the pump 20 and regulating valve 30.

Figure 2:
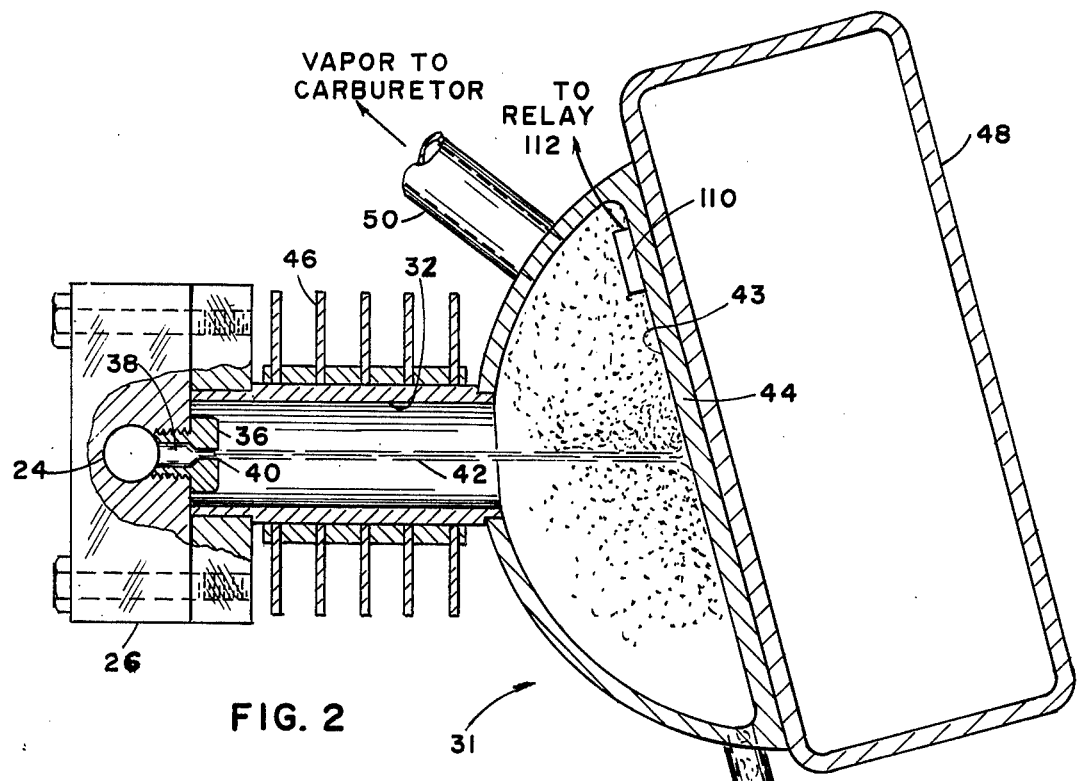
FIG. 2 is a fragmentary sectional view, to an enlarged scale, of the atomization chamber shown in FIG. 1, taken on the line 2 — 2 in FIG. 1.

Fuel nozzles 26 and 28 communicate with the pipe 24, and also with a fuel atomization chamber 31 through ducts 32 and 34, respectively. As best seen in FIG. 2, which shows both the nozzle structure 26 and the atomization chamber 31, the nozzle 26 is provided with a jet 36 formed with a passageway 38 communicating with the fuel supply pipe 24 and a discharge orifice 40 opening into the duct 32. Liquid gasoline is discharged from the pipe 24 through the jet 36 at high velocity through the duct 32 in a fine stream 42 to strike against a hot inner surface 43 of a bottom wall 44 of the atomization chamber 31. Cooling fins 46 are provided to the duct 32 to prevent overheating of the nozzle 26.

Although an electrical resistance heater (not shown) may be provided to heat the bottom wall 44 of the atomization chamber 31, the bottom wall 44 is preferably heated by contact with an exhaust manifold 48 of the engine 12.

The fine stream 42 of gasoline sprayed by the nozzle 26 against the hot inner surface 43 is constituted by tiny gasoline droplets which are smaller in size than the droplets of atomized fuel produced in a conventional carburetor. These droplets strike the hot inner surface 43 at high velocity and splatter on the surface 43 over an area several times the original diameter of the droplets. The inner surface 43 is maintained at a temperature which preferably exceeds 350° F. and is sufficient instantaneously to vaporize the fine spray 42 splattered thereon. Since the droplets are splattered into an extremely thin film on the surface 43 for vaporization and strike the surface 43 with high kinetic energy, the fine spray 42 is not only vaporized but the gasoline is broken down into substantially molecular constituents. The resulting gasoline vapor is in the form of a dry gas and is piped out of the atomization chamber 31 through an inlet pipe 50 to a carburetor 52.

In order to eliminate atmospheric pollution produced through the combustion of sulfur, tars and other impurities found in many gasolines, the temperature of the inner surface 43 is preferably controlled in such a manner that the impurities will not be vaporized but will remain in liquid form and drain out of the atomization chamber 31 through a pipe 54 into a container 56 detachably mounted on the engine 12. The container 56 may be removed periodically for disposal of the accumulated impurities therein.

Although the element generally designated by the reference numeral 52 is referred to as a carburetor, it differs radically from a conventional carburetor in that it does not have a venturi. It is actually a fuel injection carburetor but differs from known fuel injection carburetors in that it injects gaseous rather than liquid gasoline into the engine 12.

Since the pressure in the fuel supply pipe 24 is maintained at a predetermined value of, for example, 12 psi, gasoline will be discharged into the fuel atomization chamber 31 through the nozzles 26 and 28 only when the pressure in the atomization chamber 31 is lss than 12 psi. As gasoline is vaporized in the atomization chamber 31, the pressure rises in the chamber 31 and the vaporized and pressurized gasoline is forced through the pipe 50 into the carburetor 52. It is therefore unnecessary for the carburetor 52 to be provided with a venturi since the vaporized gasoline is fed thereto by pressure in the atomization chamber 31. Furthermore, since gasoline will be injected into the atomization chamber 31 through the nozzles 26 and 28 when the pressure in the chamber 31 drops slightly below 12 psi due to discharge of vaporized gasoline to the carburetor 52, the pressure in the atomization chamber 31 will be maintained at substantially 12 psi. The system 10 thereby automatically regulates the pressure of the atomized gasoline supplied to the carburetor 52.

As best seen in FIG. 1, vaporized gasoline is fed from the pipe 50 to the carburetor 52 through a connecting pipe 58. The carburetor 52 has an air induction passageway 60 (see FIG. 4) which leads from the atmosphere into the engine 12 and two fuel inlets 62 and 64 which open into the air induction passageway 60. Metering valves 66 and 68 connect the pipe 58 with the fuel inlets 62 and 64, respectively. The valve 66 comprises a metering needle 70 urged by a compression spring 72 toward a valve seat 74, with the fuel inlet 62 extending coaxially through the valve seat 74. The valve 68 comprises a metering needle 76 and a spring and valve seat (not shown) identical to the valve 66. The metering needles 70 and 76 are slidably supported by the carburetor 52 by means of bushings 78 and 80, respectively, and a bar 82 is fixed to the ends of the needles 70 and 76 by means of locknuts 84 and 86, respectively. As viewed in FIG. 4, the needles 70 and 76 are urged by the respective compression springs of the valves 66 and 68 rightwardly to block the inlets 62 and 64 respectively. Leftward movement of the bar 82 and thereby the needles 70 and 76 causes the needles 70 and 76 to unseat and unblock the inlets 62 and 64 to a progressively greater extent to increase the amount of vaporized gasoline introduced into the induction passageway 60.

Since substantially all of the vaporized gasoline is combusted in the engine 12, the air-fuel ratio is preferably maintained at the ideal value of approximately 15:1 under all operating conditions. A system for automatically proportioning the gasoline and air so as to maintain this ratio is illustrated most clearly in FIG. 3. A flapper plate 88 is rotatably mounted in the induction passageway 60 by means of a shaft 90 and is urged by a tension spring 92 to rotate counterclockwise and block the induction passageway 60. As air is induced into the engine 12 through the passageway 60, the flapper plate 88 is rotated by the air flow in a clockwise direction against the force of the spring 92 to assume an equilibrium position which is a function of the quantity of air being taken into the engine. A sector gear 94 is mounted on the shaft 90 for rotation with the flapper plate 88 and meshes with a spur gear 96 mounted for rotation with a shaft 98. A cam 100 is mounted on the shaft 98 for rotation with the spur gear 96, and is formed with a cam edge 100a, or surface. A bell crank lever 102 is rotatably mounted about a shaft 104 and has a lower arm 102a pivotally connected to the bar 82 by a link 106. A link 106a similar to the link 106 is provided on the other side of the carburetor 52 (see FIG. 4). A roller 108 mounted on an upper arm 102b of the bell crank 102 serves as a cam follower and engages with the cam surface 100a of the cam 100. The contour of the cam surface 100a has been determined experimentally and very closely approximates a hyperbolic spiral. The cam 100 may therefore be machined quite readily.

Figure 3:
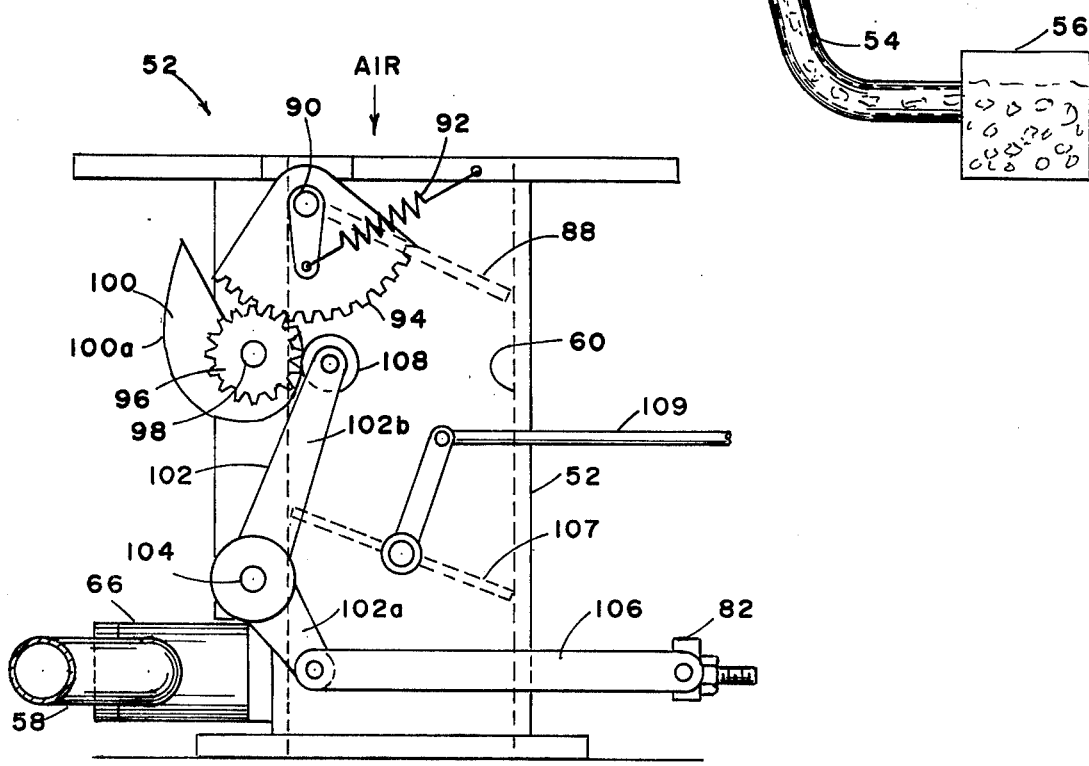
FIG. 3 is an enlarged elevation of the carburetor and fuel proportioning mechanism shown in FIG. 1.
Figure 4:
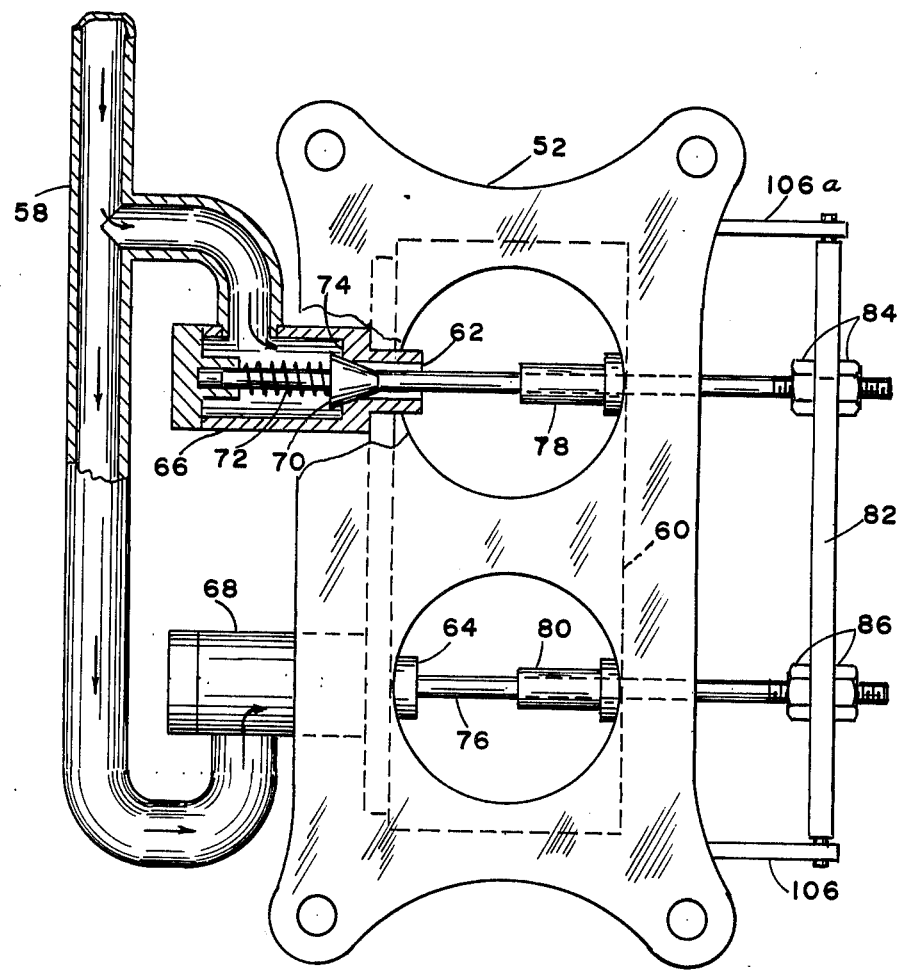
FIG. 4 is an enlarged bottom plan view, partly in section, of the carburetor.

As the air flow through the induction passageway 60 increases, the flapper plate 88 is rotated against the force of the spring 92 in a clockwise direction, as appears in FIG. 3. The sector gear 94 rotates clockwise integrally with the flapper plate 88, thereby rotating the spur gear 96 and cam 100 in a counterclockwise direction. As will be understood from examination of FIG. 3, the radius of the portion of the cam surface 100a which contacts the roller 108 progressively increases as the cam 100 is rotated counterclockwise. This causes the bell crank lever 102 to rotate clockwise and pull the link 106 and bar 82 in a left hand direction. As best seen in FIG. 4, leftward movement of the bar 82 toward the carburetor 52 causes the needles 70 and 76 progressively to unseat and increase the amount of gasoline introduced into the induction passageway 60. The cam surface 100a is shaped so that the air-fuel ratio is maintained substantially constant at all positions of the flapper plate 88 and thereby at all values of the quantity of air induced into the engine 12.

The speed of rotation of the engine 12 is preferably controlled by means of an air throttle plate 107 mounted in the induction passageway 60 for rotation by means of a throttle linkage 109 shown in fragmentary form and adapted to be manually actuated.

Since the engine 12 is designed to run on the atomized fuel mixture supplied by the system 10, means are preferably provided to run the engine on a substitute fuel during start-up and warm-up of the engine 12 when the temperature of the inner surface 43 of the atomization chamber 31 is insufficient to vaporize gasoline. For this reason, a temperature sensor, such as a thermocouple 110 (see FIGS. 1 and 2) is provided to the inner surface 43. The same function could be performed by a thermostat (not shown) attached to the exhaust manifold 48.

Figure 5:
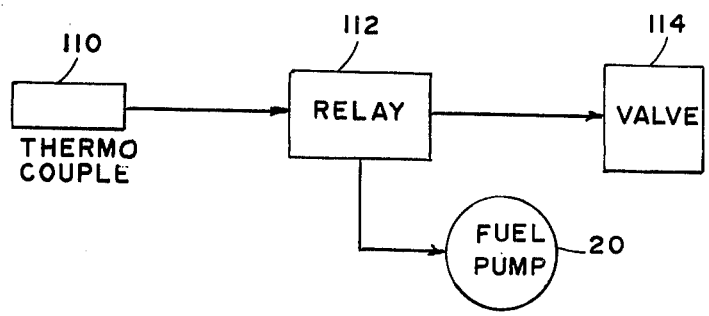
FIG. 5 is a block diagram of an electric control system shown in FIG. 1.

With particular reference to the block diagram of FIG. 5, the thermocouple 110 is connected to a relay 112, preferably of the solid-state type, so connected as to control the fuel pump 20 and a changeover valve 114. The changeover valve 114, as shown in FIG. 1, is connected between the inlet pipe 50 and the connecting pipe 58 and is electrically actuated by the relay 112. A gaseous fuel, such as propane or liquid petroleum gas, is provided in a gaseous fuel tank 116 connected to the changeover valve 114 through a gaseous fuel supply pipe 118.

When the engine 12 is being started and warmed up, the temperature of the inner surface 43 of the atomization chamber 31 is below a predetermined value such that it is insufficient to vaporize gasoline. The relay 112, acting through the valve 114 (see FIG. 1), connects the connecting pipe 58 to the gaseous fuel supply pipe 118 and concurrently de-energizes the fuel pump 20 when the thermocouple 110 senses a temperature below the predetermined value. Gaseous fuel from the tank 116 is thus free to move through the valve 114 and into the engine 12. When the sensed temperature in the atomization chamber 31 rises above the predetermined value, the relay 112 energizes the fuel pump 20 and actuates the valve 114 so as to block the flow of gas from the tank 116 and concurrently connect the connecting pipe 58 to the inlet pipe 50, thereby supplying atomized gasoline to the engine from the atomization chamber 31.

Figure 6:
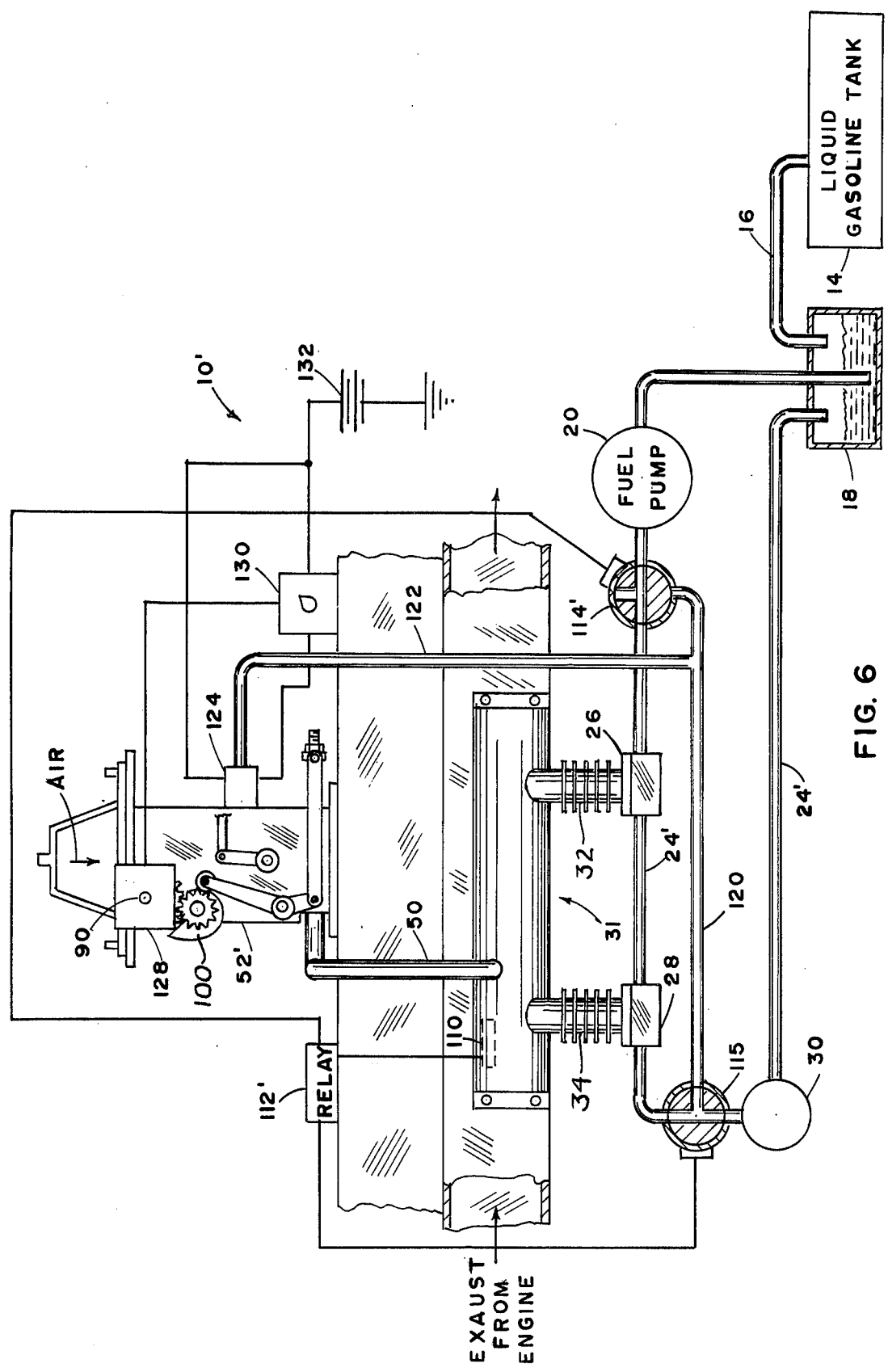
FIG. 6 is a schematic view of a second embodiment of the invention.

Another embodiment of the invention is shown in FIG. 6 in which identical elements are designated by the same reference numerals and slightly modified elements which perform similar functions are indicated by the same reference numerals suffixed by a prime designation. A modified fuel atomizing and proportioning system of the present invention is designated as 10' and is substantially identical to the system 10 except that liquid gasoline rather than gaseous fuel is injected into a carburetor 52' when the temperature of the inner surface 43 of the atomization chamber 31 is insufficient to vaporize gasoline.

In this embodiment the elements for metering the vaporized gasoline from the atomization chamber 31 are not shown for simplicity of illustration. Also, the connecting pipe 58 is omitted and the inlet pipe 50 is connected directly to the valves 66 and 68.

A changeover valve 114' is provided in a fuel supply pipe 24' between the fuel pump 20 and the nozzles 26 and 28. A bypass pipe 120 is connected between changeover valve 114' and a changeover valve 115, the latter being connected between the nozzle 28 and the regulator valve 30. An injector supply pipe 122 leads from the bypass pipe 120 to a pair of fuel injectors 124 and 126 (see FIGS. 7 and 8) communicating with a carburetor 52' so as to inject fuel into the induction passageway 60.

When the temperature of the inner surface 43 of the atomization chamber 31 is below the predetermined value, as sensed by thermocouple 110, a relay 112' controls the valves 114' and 115 to complete a fluid circuit from the pump 20 through the changeover valve 114', bypass pipe 120, changeover valve 115, pressure regulator valve 30 and reservoir 18. Fuel is thereby supplied to the fuel injectors 124 and 126 through the pipe 122 and no fuel flows to the atomization chamber 31. When the temperature in the chamber 31 rises above the predetermined value, the relay 112' controls the valves 114' and 115 to complete a fluid circuit from the fuel pump 20 through the changeover valve 114′, then to nozzles 26 and 28, changeover valve 115 and pressure regulator valve 30 to the reservoir 18, thereby terminating the supply of fuel to the fuel injectors 124 and 126 and initiating a supply of fuel to the nozzles 26 and 28.

The amount of fuel injection is preferably controlled in accordance with the quantity of induction air. For this reason, a sensor 128 is connected to the shaft 90 of the plate 88 and controls a trigger pulse generator 130 adapted to generate trigger pulses to actuate the fuel injectors 124 for fuel injection. A battery 132 is provided to power the trigger pulse generator 130 and fuel injectors 124 and 126. For the most part, the electromechanical elements of the modified system disclosed in FIG. 6 are well known to persons skilled in the art and are therefore not described in detail except for the sensor 128 and the trigger pulse generator 130, both of which are now to be described.

Figure 7:
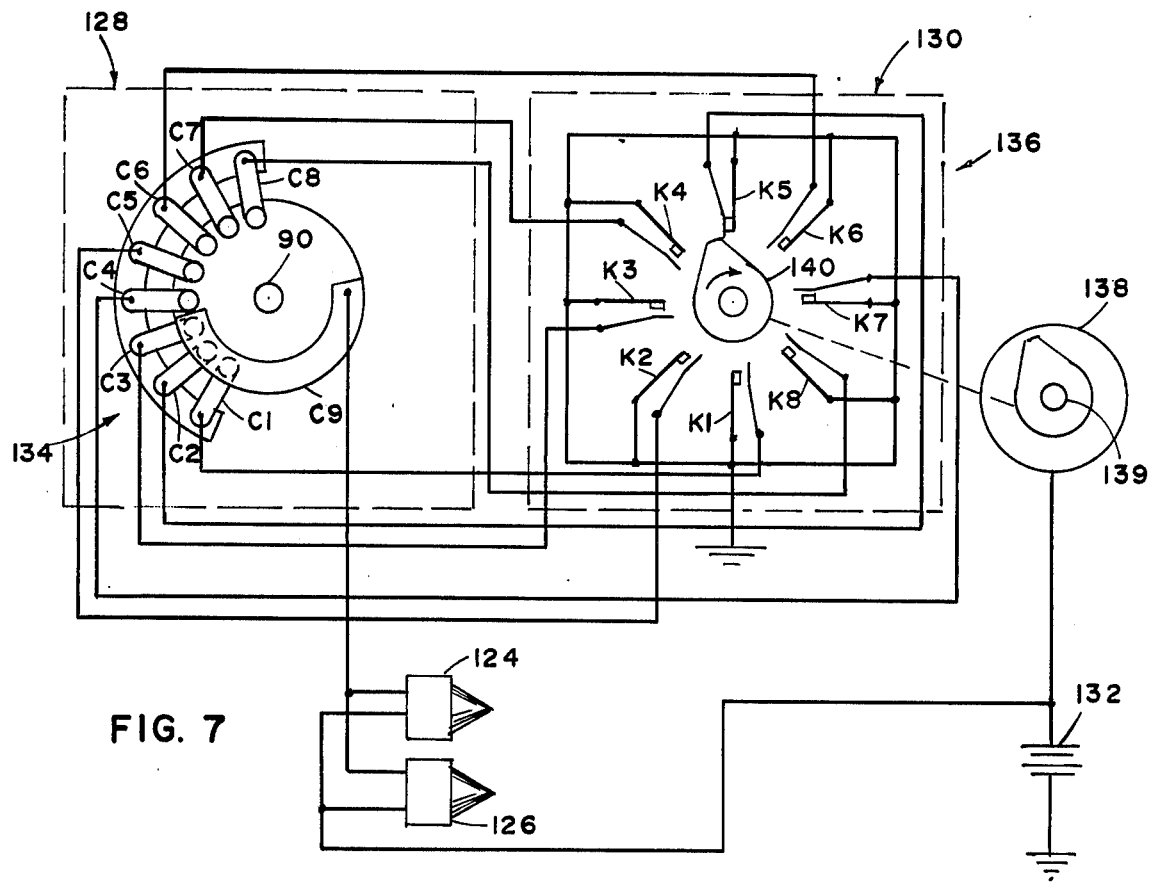
FIG. 7 is an electrical schematic diagram of a first form of the trigger pulse generator shown in FIG. 6.

As shown in FIG. 7, the sensor 128 comprises a control contact assembly 134 having a movable contact C9 electrically connected to the fuel injectors 124 and 126 and mounted on the shaft 90 of the flapper plate 88 for unitary rotation therewith. The movable contact C9 is rotatable in a clockwise direction as the induction air flow increases in order progressively to engage fixed contacts C1 to C8. In the illustrated position, the movable contact C9 is in engagement with the fixed contacts C1 to C3. The fixed contacts C1 to C8 are connected to respective movable contacts of stationary contact sets K1, K5, K3, K7, K2, K6, K4 and K8 of a distributor contact assembly 136, which is part of the trigger pulse generator 130 (see FIGS. 6 and 7).

Fixed contacts of the contact sets K1 to K8 are grounded. A constant speed motor 138, adapted to be driven at an examplary speed of 3840 rpm by the battery 132, has a shaft 139 on which is mounted a cam 140. The cam 140 is arranged sequentially to close the contact sets K1 to K8 through clockwise rotation by the motor 138. The battery 132 is connected to the fuel injectors 124 and 126 in such a manner that the injectors 124 and 126 will inject liquid gasoline into the passageway 60 whenever an electrical circuit is completed through any of the contact sets K1 to K8, any of the fixed contacts C1 to C8 and the movable contact C9.

With the engine running at low speed, the movable contact C9 will engage with only the fixed contact C1. For each revolution of the cam 140, the fuel injectors 124 and 126 will inject fuel only when the contact set K1 is closed by the cam 140, or only one fuel injection operation will occur per revolution of the cam 140. In the position of the movable contact C9 shown in FIG. 7 (in engagement with the contacts C1 to C3) the fuel injectors 124 and 126 will be actuated three times per revolution of the cam 140, or when the contacts sets K1, K3 and K5 are closed. Under full speed engine operation, with the contact C9 in engagement with all of the contacts C1 to C8, the injectors 124 and 126 will be actuated 8 times per revolution of the cam 140. The frequency of fuel injection thereby increases as a predetermined function of the quantity of induction air flow, with the contacts C1 to C8 and K1 to K8 being connected in such a manner as to space the trigger pulses as equally in time as possible.

Figure 8:
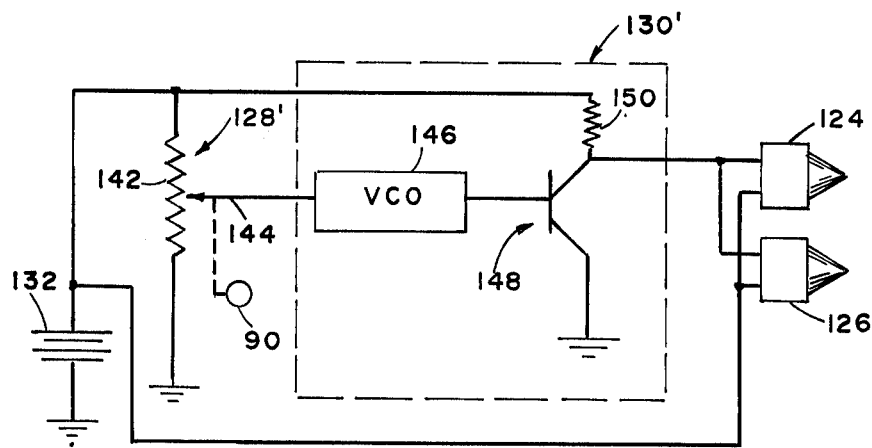
FIG. 8 is an electrical schematic diagram of a second form of the trigger pulse generator shown in FIG. 6.

Still another embodiment of the sensor 128 and the trigger pulse generator 130 is shown in FIG. 8, with the elements designated as 128′ and 130′ respectively.

The sensor 128′ is in the form of a potentiometer having an arcuately shaped resistance element 142 and a rotatably mounted slider 144 contacting the resistance element 142. The resistance element 142 is connected across the battery 132 and the slider 144 is connected to the rockable shaft 90 of the flapper plate 88 for arcuate movement therewith. The slider 144 is connected to an input of a voltage controlled oscillator 146, the output of which is connected to the base of an NPN switching transistor 148. The emitter of the transistor 148 is grounded and the collector thereof is connected to the fuel injectors 124 and 126 and also to the battery 132 through a suitable load resistor 150.

The voltage controlled oscillator 146 is arranged to produce trigger pulses to actuate the fuel injectors 124 and 126 at a frequency which increases with the quantity of induction air. The quantity of induction air is a predetermined function of the position of the flapper plate 88, rockable shaft 90 and slider 144, so that the voltage at the slider 144 which constitutes an input voltage for the oscillator 146 is a predetermined function of the quantity of induction air. Either or both of the resistance element 142 and the oscillator 146 may be made non-linear if desired to provide the perfect amount of fuel injection in response to the position of the plate 88. A positive trigger pulse output from the oscillator 146 turns on the transistor 148 so that the collector voltage thereof goes low to complete an electrical circuit through the fuel injectors 124 and 126 across the battery 132.

The sensor 128 may of course be replaced by a piezoelectric device or the like within the scope of the invention, and many other modifications will become possible for those skilled in the art after receiving the teachings of the present disclosure.

What is claimed is:

1. In an engine fuel supply system having a body defining an air induction passageway, a fuel inlet opening into the air induction passageway, a fuel atomization chamber, and a fuel pipe leading from the atomization chamber to the fuel inlet:
   a. induction air regulating means including a throttle plate rotatably positioned in the air induction passageway for controlling the amount of induction of air flowing through the passageway;
   b. means for sensing the amount of induction air flowing through the passageway, said sensing means including a flapper plate rotatably located in the air induction passageway and a spring biasing said flapper plate toward a closed position blocking the air induction passageway in opposition to the force of induction air impinging on said flapper plate, the angular position of said flapper plate at equilibrium being a function of the extent of flow of induction air;
   c. fuel regulating means in communication with the fuel inlet for controlling the amount of fuel released through the fuel inlet in dependence upon the amount of induction air flowing through the passageway as determined by said sensing means, said fuel regulating means including a needle valve for metering the quantity of fuel flowing from the fuel pipe into the fuel inlet; and,
   d. linkage connecting said flapper plate to said fuel metering valve, said linkage including a sector gear, means for mounting said sector gear on said body for unitary rotation with said flapper plate, a spur gear in engagement with said sector gear for rotation thereby, a cam coaxially mounted on said spur gear, said cam including a cam surface having a predetermined contour, a bell crank pivotally mounted on said body and having on one arm a cam follower in engagement with said cam surface, and a link connecting the other arm of said bell crank to said needle valve, the contour of said cam surface being effective to cause the release of an optimum amount of fuel over substantially the entire range of operation of said sensing means.

2. An engine fuel supply system as in claim 1 in which said predetermined contour of said cam surface is approximately a hyperbolic spiral.

* * * * *